United States Patent Office

3,093,607
Patented June 11, 1963

3,093,607
PLYWOOD ADHESIVE SOLUTIONS AND EX-
TENDER COMPOSITIONS THEREFOR
Joseph W. Ayers, Easton, Pa., assignor to Agrashell, Inc.,
Los Angeles, Calif., a corporation of Delaware
No Drawing. Filed June 30, 1960, Ser. No. 39,816
15 Claims. (Cl. 260—17.2)

This invention relates to novel extender compositions for sale to and use by plywood fabricators, and also to synthetic resin adhesive solutions and their production using these extender compositions. More specifically, it relates to extender compositions based on vegetable shell flour having mixed therewith two additional components which improve the properties of the glue solutions in several respects and also the properties of plywood bonded with the glue solutions, all as hereinafter brought out.

As set forth in my copending applications Serial No. 425,051, issued January 16, 1962, as U.S. Patent No. 3,017,303, and Serial No. 643,501, filed March 4, 1957, and now abandoned, having been replaced by application Serial No. 391,812, filed June 30, 1960. I have heretofore discovered that extender compositions composed of vegetable shell flour containing an addition of a minor amount of a finely divided, extracted lignin, either in un-oxidized form or in oxidized form, can improve the properties of phenolic resin and other glue solutions when added thereto, by increasing the viscosity of the solution and decreasing the penetration of the glue into soft or porous surfaces of core woods. The addition of the extracted lignin in oxidized form produces exceptionally high grade plywood of the most varied construction (as to both thickness and number of veneers), even when the core wood is of low grade or rough stock. The compositions and solutions of the present invention may contain basically these same ingredients.

An immediate object of the present invention is to provide extender compositions and adhesive solutions containing the same which constitute improvements over said prior compositions and solutions particularly as to more effective and uniform application of the glue solution from the rapidly rotating rolls of the glue spreading machines used in plywood manufacture.

The overall object of the invention is to provide novel adhesive solutions containing new extender compositions, possessing to a unique degree all of the desirable properties for producing plywood of consistently high quality both as to strength and water-resistance, from all grades of wood including soft wood and non-uniform or rough cores, which properties include high glue viscosity and viscosity stability, uniform transfer and spreading from the applicator rolls, stability of film during assembly and lack of excessive penetration into wood pores.

The extender compositions of the invention are mixtures containing (1) a vegetable shell flour, (2) a finely divided extracted lignin, preferably in oxidized form and (3) a non-fibrous bark phloem flour.

The vegetable shell flour used is exemplified by nut shells, as those of English and black walnuts and pecans, fruit pit shells, as those of apricots and peaches.

The extracted lignin component hereinbefore mentioned is exemplified by the so-called "alkali lignin" produced as a by-product from wood pulping processes employing alkali, the most common procedure being known as the kraft process. Extracted lignins produced by biological and selective solvent action, as well as those prepared by chemical action can be employed, and in common the lignin products are free or substantially free of combined cellulosic constituents, wood sugars and other products of the wood or other ligno-cellulosic materials from which the lignin is obtained, and such extracted lignins are all soluble in alkali, apparently producing sodium lignate.

The lignin components of the oxidized lignins of applicant's compositions are both acid-insoluble and water-insoluble and are referred to as being "extracted," for they are products which have been separated from the wood or other lignocellulose material. Sulfonic acid derivatives, or lignin sulfonates, such as are obtained in the sulfite process of paper production being acid- and water-soluble are not included within the scope of said term. Only through the use of lignin in extracted form can the quality and the performance of the adhesive compositions of the invention be attained and maintained. To produce commercially acceptable results, experience has shown that it is essential that not only must the lignocellulose extender be of known constitution and uniform character, but also the oxidized lignin component must be of a definite and known quality.

Suitable extracted ignins are described in the booklet entitled "Indulin" issued by the West Virginia Pulp and Paper Co., Charleston, West Virginia (1951). Other suitable lignin products contemplated are disclosed in the booklet entitled "Commercial Lignins" by Robert S. Aries and Arthur Pollak issued by he Northeastern Wood Utilization Council, New Haven, Connecticut (1949).

The oxidized lignin preferably used in the practice of the invention may be obtained by oxidation in neutral solution, in alkaline solution or, under certain circumstances, in an acid solution, but it can also be accomplished electrolytically or by enzymatic action. Practically considered, the oxidation is accomplished under aqueous alkaline conditions simply by introducing oxygen into the aqueous alkaline suspension of the extracted lignin.

The oxidized extracted lignins are those extracted lignins hereinbefore described which have been oxidized to a point where they impart an increased viscosity of practical effect to aqueous glue solutions in which they are incorporated. The oxidation effected imparts stability to glue solutions to which the oxidized lignin has been added, by preventing loss of glue at the glue lines due to excessive penetration into the pores of the surfaces of the plies during curing. This retention of viscosity during heating to the setting temperature and the prevention of excessive flow into the pores constitutes the primary advantage of the presence of the extracted lignin in the oxidized condition. Oxidation to an extent providing any appreciable degree of viscosity increase in the aqueous suspension improves the retention at the glue line.

As is indicated in the hereinbefore mentioned Indulin booklet (page 18), the oxidation may be effected satisfactorily by introducing oxygen into an alkaline solution in water or other solvent until about 1 to 7 mols of oxygen per mol of lignin (M.W. 840) has taken up. The alkalinity may be imparted by the addition of any alkali, suitably sodium hydroxide, in a quantity of from 1–16 mols per mol of extracted lignin. As is also pointed out in said booklet, the rate and extent of oxygen absorption is increased with increasing alkali content. If the oxidation is continued too long, the gel is advanced in structure too far, and drying and further processing becomes very difficult or practically impossible. Thus it is the practical problem of handling which limits the permissible amount of oxidation. In all instances, the oxidation is terminated, of course, before any drastic breakdown of the lignin occurs and destroys their viscosity imparting qualities.

An oxidized lignin found particularly effective was produced by concentrating a spent black cooking liquor obtained from a kraft paper process to provide a liquid containing 18 to 20% solids. Cooled carbon dioxide gas was then bubbled through the concentrated solution while said solution was being continuously circulated, to precipitate the lignin. Upon completion of the precipitation, the carbonated liquor was heated at a temperature close to boiling to bring about coagulation of the lignin. After being cooled, the coagulated liquor was separated by filtration and the lignin was purified by washing.

The washed cake was then repulped in water and sufficient sodium hydroxide was added to adjust the pH of the suspension to an approximate value of 9. Thereupon air was blown into the solution during vigorous agitation until oxidation had occurred, this result being determined by the viscosity increase of the suspension. After oxidation, the suspension was concentrated, filtered and dried, this latter result preferably being obtained by spray drying. The final product thus obtained can be described as a technically pure, oxidized, extracted alkali lignin.

The completion of the oxidation step in the above-described process was determined by a standardized test involving adding 60 grams of the oxidized product and 300 grams of distilled water to a 600 cc. beaker. The mixture in the beaker was then stirred for three minutes with an electric stirrer. Next a sodium hydroxide solution made up of 50 grams water and 2 grams of solid sodium hydroxide was added. The resulting mixture was then electrically stirred for a period of five minutes. Thereupon, the mass was adjusted to a temperature of 77° F. and allowed to stand at this temperature for fifteen minutes. At the end of this period, the viscosity was measured with a Brookfield viscosimeter equipped with a No. 4 spindle, at 6 r.p.m. The reading was 90,000 centipoises.

Using this test for the determination and control of the oxidation, oxidized extracted lignins operable for the purposes of the present invention have revealed viscosities as low as 5000 centipoises and viscosities much higher than the 90,000 centipoises reading.

No invention is claimed as to the bark phloem flour per se, for examples of such materials as are utilized in the practice of the invention are disclosed in the patent literature, as in the Heritage Patents No. 2,574,784 and 2,574,785.

The bark phloem may be obtained, for example, from pine, hemlock, fir and cedar trees. The distinctive feature of these bark materials is that they are non-fibrous and generally contain a very much higher percentage of lignin than the wood itself and also other naturally occurring ligno-cellulosic materials. A typical commercially available bark phloem flour has the following analysis and properties:

| Content: | Percent by weight |
|---|---|
| Cellulose | 29 |
| Lignin (from fir) | 59 |
| Properties: | |
| Sol. in cold water 24 hrs | 7.54 |
| Sol. in hot water 2 hrs | 11.98 |
| Sol. in 1% NaOH 1 hr | 56.70 |
| Sol. in 10% $H_2SO_4$ 1 hr | 17.85 |
| Particle size distribution: | |
| On 100 mesh | 6 |
| 100–200 mesh | 45 |
| 200–325 mesh | 24 |
| Through 325 mesh | 25 |

The proportion of the bark flour employed can vary over a very wide range. In the extender compositions, the bark flour content can be present in an amount as low as 5%, but the quantity can be increased to about 75% under favorable circumstances, and the extracted lignin content, whether in its oxidized form or not, may amount to from about 5% to 50%, and preferably from 15 to 20%, based on the total weight of the three component extender composition. In the compositions preferred at the present time, the vegetable shell flour is present as the major component, the other two components being present in minor amounts.

The three components to be combined to form the extender composition may be blended merely by mixing the same in finely divided form in a standard ribbon type blender until a homogeneous product is obtained.

The extender compositions hereinbefore described can be employed very advantageously with plywood glue solutions of conventional types which are generally aqueous alkaline emulsions of artificial resins. Under some conditions, the amount of alkali already in the glue solution is sufficient, but ordinarily the addition of caustic alkali or sodium carbonate in amounts somewhat in excess of that which reacts with the extender components improves the bonding quality of the glue solution. Although 5% of either or both of said alkali materials (calculated in relation to the amount of extender composition present) may be sufficient in some glue solutions, the amount may be increased to 15 to 20% or more, as to each of said alkaline materials.

Plywood fabricators obtaining the extender compositions hereinbefore described can produce the adhesive solutions of the invention by gradually adding such compositions to the water to be used for dilution of the resin to which has already been added the sodium hydroxide or other caustic alkali ordinarily employed, and the mixture is agitated until uniform fluidity is obtained, 20 to 30 minutes usually being sufficient. When sodium carbonate is to be employed, it is preferably introduced immediately after the extender composition has been added. The application of heat is not ordinarily required. Upon completion of the mixing operation the resin glue solution is added and the mass is again agitated for a few minutes or until a homogeneous mass is obtained.

The resin glue solutions in which the extender compositions are particularly effective may be described as aqueous colloidal solutions of thermosetting aldehydic resin glues. Such solutions are produced and sold by several companies (usually in solutions of 40–50 resin solids content) and their production constitutes no part of the present invention. The resins used include condensation products of phenolic compounds such as phenol, cresol, and resorcinol, or amino-compounds such as urea and melamine with an aldehyde, such as formaldehyde and acetaldehyde.

In the glue solutions produced in accordance with the present invention, conventional ratios of resin to extender composition to water can be employed. When conventional phenolic resin glue aqueous emulsions (about 40–50% solids) are employed the weight ratio of resin to extender to water is, suitably, 5/1/1.75. The ratio of extender and water in the compositions can be greatly increased to provide solutions having ratios of as high as 5/4/7, and such glue solutions are economically acceptable for the production of plywood of one type or another, but all of high grade.

In accordance with a modification of the invention, the extender compositions and adhesive solutions contain in addition to the oxidized lignin, also some plain or unoxidized extracted lignin, all or part of which may be in the form of sodium lignate, as Indulin C. The unoxidized extracted lignin will ordinarily replace part of the oxidized extracted lignin in the compositions herein defined. The amount of the oxidized lignin which can be replaced by unoxidized lignin depends upon a number of factors including the grade or porosity of the wood and viscosity requirements of the glue solution. Displacement in greatest amounts is possible when plywood products of thin construction, as 3/16 inch, are being produced. From 5 to 75% of the oxidized lignin may be replaced by the unoxidized lignin (and/or sodium lignate), and when thin plywood is fabricated, the displacement may reach as high as 90%.

In a special embodiment of the invention leading to the production of particularly high grade plywood, a minor or small amount of epoxy resin is incorporated in the compositions hereinbefore defined. The epoxy resin need be present in an amount as little as .4 to 1%, by weight, of the phenolic resin content to impart worthwhile improvement in quality of the bond. Amounts as high as 20% can be used, but such higher amounts are now economically unfeasible. The epoxy resin is preferably introduced by preliminarily coating the shell flour particles with 2 to 7% resin, but such resin may be mixed in solution form with the phenolic resin solution. The epoxy resin used can be any of the commercial adhesive products such as may be produced by reacting bis-phenols or other polyhydroxy compounds with either of the usual chlorohydrins, epichlorohydrin or dichlorohydrin, specific examples of the same being disclosed in the hereinbefore mentioned copending application Serial No. 643,-501. Other epoxy resins utilizable are disclosed in the book entitled "Epoxy Resins" by Henry Lee and Kris Neville published by the McGraw-Hill Book Company, Inc., New York, in 1957.

*Example 1*

Sixty parts of English walnut shell flour, 15 parts of finely divided oxidized lignin produced from alkali lignin derived in a kraft paper process, and 25 parts of the bark phloem flour hereinbefore described are mixed in a ribbon blender until a homogeneous product is obtained.

*Example 2*

The procedure of Example 1 is repeated using 10 parts of oxidized lignin and 10 parts of extracted lignin (unoxidized) in place of the 15 parts of oxidized lignin.

*Example 3*

The procedure of Example 1 is repeated except that only 10 parts of oxidized lignin are used, and 10 parts of sodium lignate are added.

*Example 4*

An adhesive solution is prepared by introducing 115 parts of the extender composition of Example 1 into a mixing tank into which has already been placed 200 parts of water and 30 parts of an aqueous sodium hydroxide solution of 50% concentration and the mass is continuously agitated during the introduction. Next 15 parts of sodium carbonate are added and the mixing is continued for about 20 minutes. Thereupon, 500 parts of a phenol-formaldehyde glue solution in aqueous alkaline emulsion form (viscosity G; solids content 40.8%) are added to the mixer and agitation is continued for about 5 minutes. An aqueous glue solution is thereby obtained in a condition ready for pumping to the well of the glue blending machine for application to the plywood veneer.

*Example 5*

The procedure of Example 1 is employed using an English walnut shell flour which has been modified by coating the same with an epoxy resin glue produced by the reaction of epichlorohydrin and 2,2 bis (parahydroxy phenol) propane in aqueous alkaline solution.

The components of the extender compositions and the glue solutions herein referred to, other than the bark phloem product component are described in more detail along with additional examples, procedures and advantages in the hereinbefore mentioned prior applications.

The glue solutions of the present invention have several outstanding advantages:

They have an exceptionally high viscosity, leading to more exact and uniform quantities of glue spread in the film applied to the core wood and to greater resistance to the centrifugal force of the rapidly revolving spreader rolls of the glue applying machine, which force has a tendency to throw glue solution off the rolls. After the glue solution has flowed over the wood surfaces in an even spread, it (1) ceases to flow and assumes a limpid gel structure, thixotropic in character, and thus (2) does not penetrate too deeply into the wood even though the wood may be quite porous in character, (3) does not lose too much water by evaporation and (4) retains its binding qualities over a substantial period, providing long assembly time life.

This application is a continuation-in-part of my copending application Serial No. 643,514 filed March 4, 1957, and now abandoned.

It should be understood that the invention is not limited to the exact compounds, proportions, procedures and conditions herein described but that it extends to all equivalents which will occur to those skilled in the art upon consideration of the scope of the claims appended hereto.

I claim:

1. A composition of matter for adding to and improving the viscosity, wood penetration, bonding and other properties of plywood adhesive and other laminating adhesive solutions, which comprises a homogeneous mixture of a major proportion of a vegetable shell flour extender and minor proportions, each of at least 5% by weight, of finely-divided extracted lignin in oxidized form containing about 1 to 7 mols of added oxygen per mol of lignin, and of a non-fibrous bark phloem flour.

2. A composition of matter for adding to and improving the viscosity, wood penetration, bonding and other properties of plywood adhesive and other laminating adhesive solutions, which comprises a homogeneous mixture of a major proportion of a vegetable shell flour extender and minor proportions, each of at least 5% by weight, of finely-divided extracted lignin at least 10% of which is oxidized lignin containing about 1 to 7 mols of added oxygen per mol of lignin, and of a non-fibrous bark phloem flour having a lignocellulose content in which about 59% is lignin and 29% is cellulose, by weight.

3. A composition of matter for adding to and improving the viscosity, wood penetration, bonding and other properties of plywood adhesive and other laminating adhesive solutions, which comprise a homogeneous mixture of a major proportion of a nut shell flour and minor proportions, each of at least 5% by weight, of a finely-divided extracted lignin in oxidized form containing about 1 to 7 mols of added oxygen per mol of lignin, and of a non-fibrous bark phloem flour.

4. A composition of matter for adding to and improving the viscosity, wood penetration, bonding and other properties of plywood adhesive and other laminating adhesive solutions, which comprises a homogeneous mixture of a major proportion of a vegetable shell flour extender, 5 to 20% by weight of finely-divided extracted lignin in oxidized form containing about 1 to 7 mols of added oxygen per mol of lignin, said lignin being derived from wood by the kraft process and subsequently purified by the removal of non-ligneous materials, and at least 5% by weight of a non-fibrous bark phloem flour.

5. Plywood- and laminating-adhesive solutions comprising a thermosetting aldehydic resin glue selected from the group consisting of phenolic-aldehyde resins and amino-aldehyde resins in aqueous alkaline colloidal solution, having dispersed therein an extender composition comprising a major proportion of a vegetable shell flour extender and minor proportions, each of at least 5% of the weight of said composition, of extracted lignin at least 10% of which is oxidized lignin containing about 1 to 7 mols of added oxygen per mol of lignin, and of a non-fibrous bark phloem flour.

6. Plywood- and laminating-adhesive solutions comprising a thermosetting aldehydic resin glue selected from the group consisting of phenolic-aldehyde resins and amino-aldehyde resins in aqueous alkaline colloidal solution and having dispersed therein an extender composition comprising a major proportion of a vegetable shell flour extender and minor proportions, each of at least 5% of the weight of said composition, of extracted lignin of which at least 10% is oxidized lignin containing 1 to 7 mols of added oxygen per mol of lignin, and of a non-fibrous bark phloem flour, said solutions having said lignin and said bark flour dissolved therein together with a minor amount of free alkali.

7. Plywood- and laminating- adhesive solutions comprising a thermosetting aldehydic resin glue selected from the group consisting of phenolic-aldehyde resins and amino-aldehyde resins in aqueous alkaline colloidal solution, having dispersed therein an extender composition comprising a major proportion of a vegetable shell flour extender and minor proportions, each of at least 5% of the weight of said composition, of extracted alkali lignate oxidized to contain 1 to 7 mols of added oxygen per mol of lignin, and of a non-fibrous bark phloem flour, the lignate and the bark flour being substantially dissolved in said solutions by the action of alkali in said solutions.

8. Plywood- and laminating-adhesive solutions comprising a theromsetting aldehydic resin glue selected from the group consisting of phenolic-aldehyde resins and amino-aldehyde resins in aqueous alkaline colloidal solution, having dispersed therein an extender composition comprising a major proportion of a nut shell flour extender, at least 5% by weight of an alkali-dissolved, extracted lignin oxidized so as to contain about 1 to 7 mols of added oxygen per mol of lignin and at least 5% by weight of a non-fibrous bark phloem flour.

9. A composition of matter for adding to and improving the viscosity, wood penetration, bonding and other properties of plywood adhesive and other laminating adhesive solutions, which comprise a homogeneous mixture of a major proportion of a vegetable shell flour extender coated with from 2 to 7% of an epoxy resin produced by the reaction of a polyhydroxy hydrocarbon with a compound selected from the group consisting of epichlorohydrin and dichlorohydrin, and containing free epoxy groups, and minor proportions, each of at least 5% by weight, of finely-divided extracted lignin at least 10% of which is oxidized lignin containing about 1 to 7 mols of added oxygen per mol of lignin, and of a non-fibrous bark phloem flour.

10. Plywood- and laminating-adhesive solutions comprising a thermosetting aldehydic resin glue selected from the group consisting of phenolic-aldehyde resins and amino-aldehyde resins in aqueous alkaline colloidal solution, containing 0.4 to 20% in relation to the weight of the aldehydic resin present of an epoxy resin produced by the reaction of a polyhydroxy hydrocarbon with a compound selected from the group consisting of epichlorohydrin and dichlorohydrin, and containing free epoxy groups, having dispersed therein an extender composition comprising a major proportion of a vegetable shell flour extender and minor proportions, each of at least 5% of the weight of said composition, of extracted lignin at least 10% of which is oxidized lignin containing about 1 to 7 mols of added oxygen per mol of lignin, and of a non-fibrous bark phloem flour.

11. Plywood- and laminating-adhesive solutions comprising a thermosetting aldehydic resin glue selected from the group consisting of phenolic-aldehyde resins and amino-aldehyde resins in aqueous alkaline colloidal solution, containing 0.4 to 20% in relation to the weight of the aldehydic resin present of an epoxy resin produced by the reaction of a polyhydroxy hydrocarbon with a compound selected from the group consisting of epichlorohydrin and dichlorohydrin, and containing free epoxy groups, having dispersed therein an extender composition comprising a major proportion of a vegetable shell flour extender and minor proportions, each of at least 5% of the weight of said composition, of extracted lignin in oxidized form containing about 1 to 7 mols of added oxygen per mol of lignin and of a non-fibrous bark phloem flour.

12. A composition of matter for adding to and improving the viscosity, wood penetration, bonding and other properties of plywood adhesive and other laminating adhesive solutions, which comprises a homogeneous mixture of a major proportion of a vegetable shell flour extender and minor proportions, each of at least 5% by weight, of a non-fibrous bark phloem flour and of both a finely divided substantially unoxidized extracted lignin and a finely divided oxidized extracted lignin containing at least 1 to 7 mols of added oxygen per mol of lignin.

13. A composition of matter for adding to and improving the viscosity, wood penetration, bonding and other properties of plywood adhesive and other laminating adhesive solutions, which comprises a homogeneous mixture of a major proportion of a vegetable shell flour extender and minor proportions, each of at least 5% by weight, of a non-fibrous bark phloem flour and of both a finely divided substantially unoxidized sodium lignate and a finely divided oxidized extracted lignin containing about 1 to 7 mols of added oxygen per mol of lignin.

14. Plywood- and laminating-adhesive solutions comprising a thermosetting aldehydic resin glue selected from the group consisting of phenolic-aldehyde resins and amino-aldehyde resins in aqueous alkaline colloidal solution, having dispersed therein an extender composition comprising a major proportion of a vegetable shell flour extender and minor proportions, each of at least 5% by weight, of a non-fibrous bark phloem flour and of both an unoxidized extracted lignin and an oxidized extracted lignin containing about 1 to 7 mols of added oxygen per mol of lignin.

15. Plywood- and laminating-adhesive solutions comprising a thermosetting aldehydic resin glue selected from the group consisting of phenolic-aldehyde resins and amino-aldehyde resins in aqueous alkaline colloidal solution, having dispersed therein an extender composition comprising a major proportion of a vegetable shell flour extender and minor proportions, each of at least 5% by weight, of a non-fibrous bark phloem flour and of both sodium lignate aind an oxidized extracted lignin containing about 1 to 7 mols of added oxygen per mol of lignin.

References Cited in the file of this patent

UNITED STATES PATENTS

| | | |
|---|---|---|
| 2,161,748 | Samaras | June 6, 1939 |
| 2,506,486 | Bender et al. | May 2, 1950 |
| 2,507,465 | Ayers | May 9, 1950 |
| 2,669,522 | Othmer | Feb. 16, 1954 |
| 2,781,327 | Ayers et al. | Feb. 12, 1957 |
| 2,878,197 | Baxter et al. | Mar. 17, 1959 |

UNITED STATES PATENT OFFICE
CERTIFICATE OF CORRECTION

Patent No. 3,093,607 June 11, 1963

Joseph W. Ayers

It is hereby certified that error appears in the above numbered patent requiring correction and that the said Letters Patent should read as corrected below.

Column 2, line 19, for "ignins" read -- lignins --; line 66, after "lignin" insert -- molecules --; column 8, line 49, for "aind" read -- and --.

Signed and sealed this 7th day of January 1964.

(SEAL)
Attest:

ERNEST W. SWIDER

Attesting Officer

EDWIN L. REYNOLDS

Acting Commissioner of Patents